US012045484B2

(12) United States Patent
Fan et al.

(10) Patent No.: US 12,045,484 B2
(45) Date of Patent: Jul. 23, 2024

(54) DATA PLACEMENT SELECTION AMONG STORAGE DEVICES ASSOCIATED WITH STORAGE NODES OF A STORAGE SYSTEM

(71) Applicant: Dell Products L.P., Round Rock, TX (US)

(72) Inventors: Huijuan Fan, Chengdu (CN); Chi Chen, Chengdu (CN); Hailan Dong, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 44 days.

(21) Appl. No.: 17/964,138

(22) Filed: Oct. 12, 2022

(65) Prior Publication Data
US 2024/0103746 A1  Mar. 28, 2024

(30) Foreign Application Priority Data
Sep. 26, 2022  (CN) .......................... 202211178700.0

(51) Int. Cl.
*G06F 3/06* (2006.01)
(52) U.S. Cl.
CPC ............ *G06F 3/064* (2013.01); *G06F 3/0604* (2013.01); *G06F 3/0679* (2013.01)
(58) Field of Classification Search
CPC ....... G06F 3/064; G06F 3/0604; G06F 3/0679
See application file for complete search history.

(56) References Cited

U.S. PATENT DOCUMENTS

| 2012/0290801 | A1* | 11/2012 | Hasegawa | ........... | H04L 67/1097 |
| | | | | | 711/E12.001 |
| 2013/0041875 | A1* | 2/2013 | Kan | ...................... | G06F 3/0625 |
| | | | | | 707/705 |
| 2014/0012887 | A1* | 1/2014 | Tamano | ................ | G06F 16/182 |
| | | | | | 707/827 |
| 2015/0234846 | A1* | 8/2015 | Moore | .................. | G06F 16/137 |
| | | | | | 707/747 |

(Continued)

OTHER PUBLICATIONS

NVM Express, "NVM Express, Revision 1.3," NVM Express, May 1, 2017, 282 pages.

(Continued)

*Primary Examiner* — Ryan Bertram
(74) *Attorney, Agent, or Firm* — Ryan, Mason & Lewis, LLP

(57) ABSTRACT

An apparatus comprises a processing device configured to receive a request to store data on a storage system, and to determine storage node correlation metrics for storage nodes of the storage system characterizing probabilities of input/output operations being directed to filesystems having data stored on the storage nodes. The processing device is also configured to select, based on the storage node correlation metrics, one of the storage nodes to utilize for storing a given portion of the data, and to determine storage device correlation metrics for storage devices of the selected storage node characterizing probabilities of input/output operations being directed to filesystems having data stored on the storage devices. The processing device is further configured to select, based on the storage device correlation metrics, one of the storage devices of the selected storage node to utilize for storing the given data portion.

20 Claims, 14 Drawing Sheets

(56) References Cited

U.S. PATENT DOCUMENTS

| | | | | |
|---|---|---|---|---|
| 2016/0259813 | A1* | 9/2016 | Krupakaran | G06F 16/178 |
| 2017/0235609 | A1* | 8/2017 | Wires | G06F 16/182 |
| | | | | 718/104 |
| 2019/0050302 | A1* | 2/2019 | Juniwal | G06F 3/0689 |
| 2019/0297144 | A1* | 9/2019 | Zanpure | G06F 11/2023 |
| 2023/0214364 | A1* | 7/2023 | Fan | G06F 16/183 |
| | | | | 707/827 |

OTHER PUBLICATIONS

G. Liu et al., "Computing Load Aware and Long-View Load Balancing for Cluster Storage Systems," 2015 IEEE International Conference on Big Data, Oct. 29-Nov. 1, 2015, pp. 174-183.

D. Kunkle et al., "A Load Balancing Framework for Clustered Storage Systems," Proceedings of the 15th International Conference on High Performance Computing, Dec. 2008, pp. 57-72.

G.-W. You et al., "Scalable Load Balancing in Cluster Storage Systems," International Conference on Distributed Systems Platforms and Open Distributed Processing, Dec. 12, 2011, pp. 101-122.

D. Borthakur, "HDFS Architecture Guide," https://hadoop.apache.org/docs/r1.2.1/hdfs_design.html, Oct. 10, 2020, 8 pages.

The Apache Software Foundation, "#HDFS-1804, " https://issues.apache.org/jira/si/jira.issueviews:issue-html/HDFS-1804/HDFS-1804.html, Accessed Nov. 16, 2021, 6 pages.

Apache Software Foundation, "Add a New Block-volume Device Choosing Policy that Looks at Free Space," https://issues.apache.org/jira/si/jira.issueviews:issue-html/HDFS-1804/HDFS-1804.html, Accessed Oct. 12, 2022, 6 pages.

Waytoeasylearn, "HDFS Read and Write Architecture—Simplified Learning," https://www.waytoeasylearn.com/learn/hdfs-read-and-write-architecture/, Accessed Aug. 14, 2022, 12 pages.

K. Cheng et al., "Improving HDFS I/O Utilization for Efficiency," https://www.uber.com/blog/improving-hdfs-i-o-utilization-for-efficiency/, Oct. 13, 2021, 10 pages.

* cited by examiner

DATA PLACEMENT SELECTION AMONG STORAGE DEVICES ASSOCIATED WITH STORAGE NODES OF A STORAGE SYSTEM

RELATED APPLICATION

The present application claims priority to Chinese Patent Application No. 202211178700.0, filed on Sep. 26, 2022 and entitled "Data Placement Selection Among Storage Devices," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for data placement selection among storage devices associated with storage nodes of a storage system.

In one embodiment, an apparatus comprises at least one processing device comprising a processor coupled to a memory. The at least one processing device is configured to perform the steps of receiving a request to store one or more portions of data on a storage system, the storage system comprising two or more storage nodes, the one or more portions of data being associated with one or more filesystems, and determining storage node correlation metrics for the two or more storage nodes of the storage system, the storage node correlation metric for a given one of the two or more storage nodes characterizing a probability of input/output operations, directed to data of the one or more filesystems, involving data stored on the given storage node. The at least one processing device is also configured to perform the steps of selecting, based at least in part on the storage node correlation metrics, one of the two or more storage nodes of the storage system to utilize for storing a given one of the one or more portions of data, and determining storage device correlation metrics for two or more storage devices of the selected storage node, the storage device correlation metric for a given one of the two or more storage devices characterizing a probability of the input/output operations, directed to data of the one or more filesystems, involving data stored on the given storage device. The at least one processing device is further configured to perform the steps of selecting, based at least in part on the storage device correlation metrics, one of the two or more storage devices of the selected storage node to utilize for storing the given data portion, and storing the given data portion on the selected storage device of the selected storage node.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
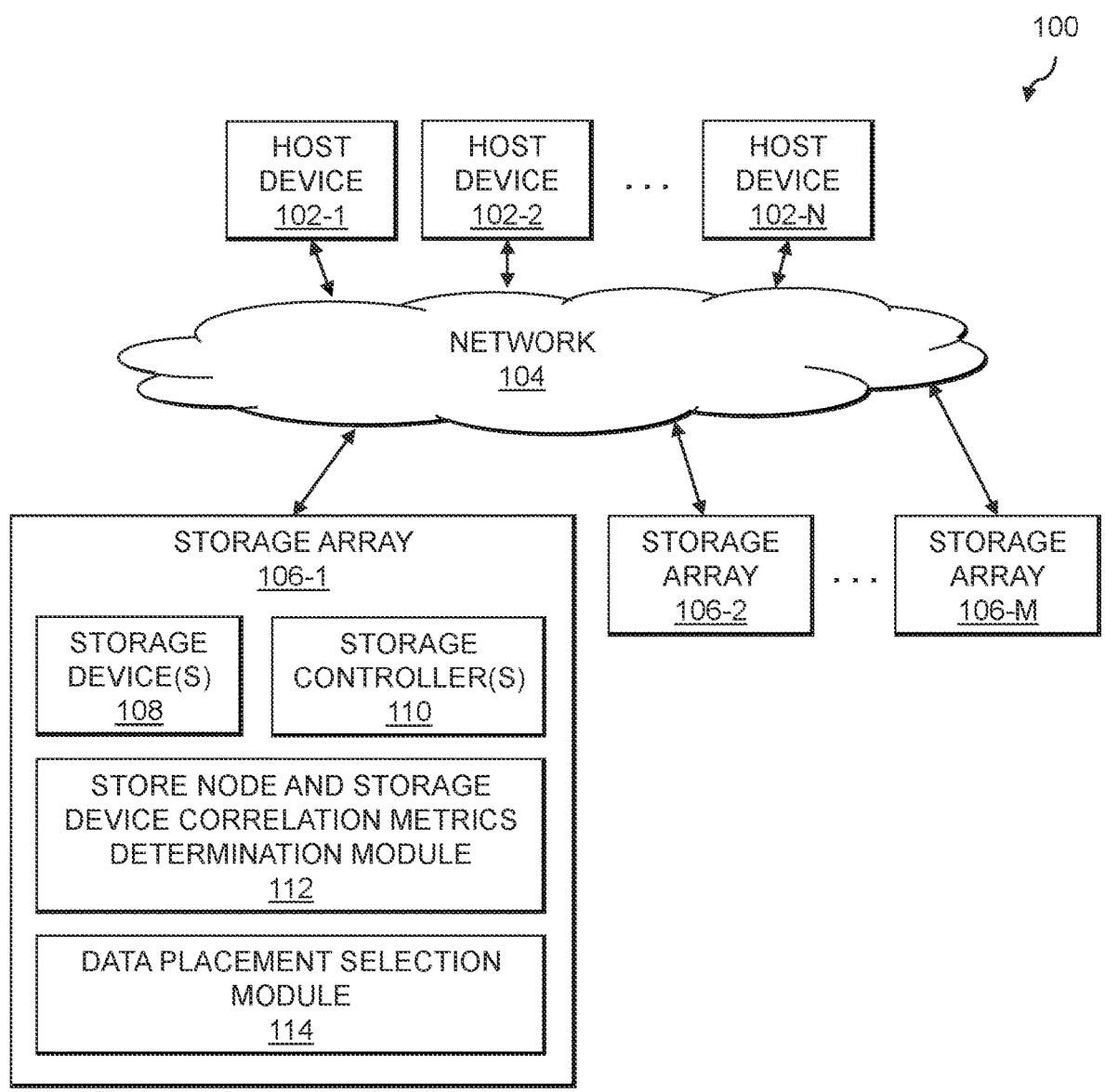
FIG. 1 is a block diagram of an information processing system configured for data placement selection among storage devices associated with storage nodes of a storage system in an illustrative embodiment.

FIG. 1 shows an information processing system 100 configured in accordance with an illustrative embodiment to provide functionality for data placement selection among storage devices associated with storage nodes of a storage system. The information processing system 100 comprises one or more host devices 102-1, 102-2, ... 102-N (collectively, host devices 102) that communicate over a network 104 with one or more storage arrays 106-1, 106-2, ... 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system. In some embodiments, the storage arrays 106 may be part of a storage cluster (e.g., where the storage arrays 106 may be used to implement one or more storage nodes in a cluster storage system comprising a plurality of storage nodes interconnected by one or more networks), and the host devices 102 are assumed to submit IO operations to be processed by the storage cluster.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

At least one of the storage controllers of the storage arrays 106 (e.g., the storage controller 110 of storage array 106-1) is assumed to implement functionality for data placement selection among the storage devices 108 of the storage array 106-1 that provide storage for a distributed filesystem. Such functionality is provided via a storage node and storage device correlation metrics determination module 112 and a data placement selection module 114. The storage array 106-1 is assumed to comprise a given one of two or more nodes of a distributed filesystem cluster, and receives requests to store one or more portions of data in the distributed filesystem of the distributed filesystem cluster.

The storage node and storage device correlation metrics determination module 112 is configured to receive a request to store one or more portions of data on a storage system comprising the storage arrays 106. The one or more portions of data are associated with one or more filesystems. The storage node and storage device correlation metrics determination module 112 is also configured to determine storage node correlation metrics for the two or more storage arrays 106 of the storage system. The storage node correlation metric for a given one of the two or more storage arrays 106 characterizes a probability of IO operations, which are directed to data of the one or more filesystems, involving data stored on the given storage array. The data placement selection module 114 is configured to select, based at least in part on the storage node correlation metrics, one of the two or more storage arrays 106 of the storage system to utilize for storing a given one of the one or more portions of data.

The storage node and storage device correlation metrics determination module 112 is further configured to determine storage device correlation metrics for two or more storage devices 108 of the selected storage array. The storage device correlation metric for a given one of the two or more storage devices 108 characterizes a probability of the IO operations, which are directed to data of the one or more filesystems, involving data stored on the given storage device. The data placement selection module 114 is also configured to select, based at least in part on the storage device correlation metrics, one of the two or more storage devices 108 of the selected storage array to utilize for storing the given data portion. The data placement selection module is further configured to store the given data portion on the selected storage device of the selected storage array.

In some embodiments, the storage arrays 106 in the FIG. 1 embodiment provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

Although in the FIG. 1 embodiment the storage node and storage device correlation metrics determination module 112 and the data placement selection module 114 are shown as being implemented internal to the storage array 106-1 and outside the storage controllers 110, in other embodiments one or both of the storage node and storage device correlation metrics determination module 112 and the data placement selection module 114 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of storage node and storage device correlation metrics determination module 112 and the data placement selection module 114.

At least portions of the functionality of storage node and storage device correlation metrics determination module 112 and the data placement selection module 114 may be implemented at least in part in the form of software that is stored in memory and executed by a processor.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 13 and 14.

It is to be understood that the particular set of elements shown in FIG. 1 for data placement selection among storage devices associated with storage nodes of a storage system is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
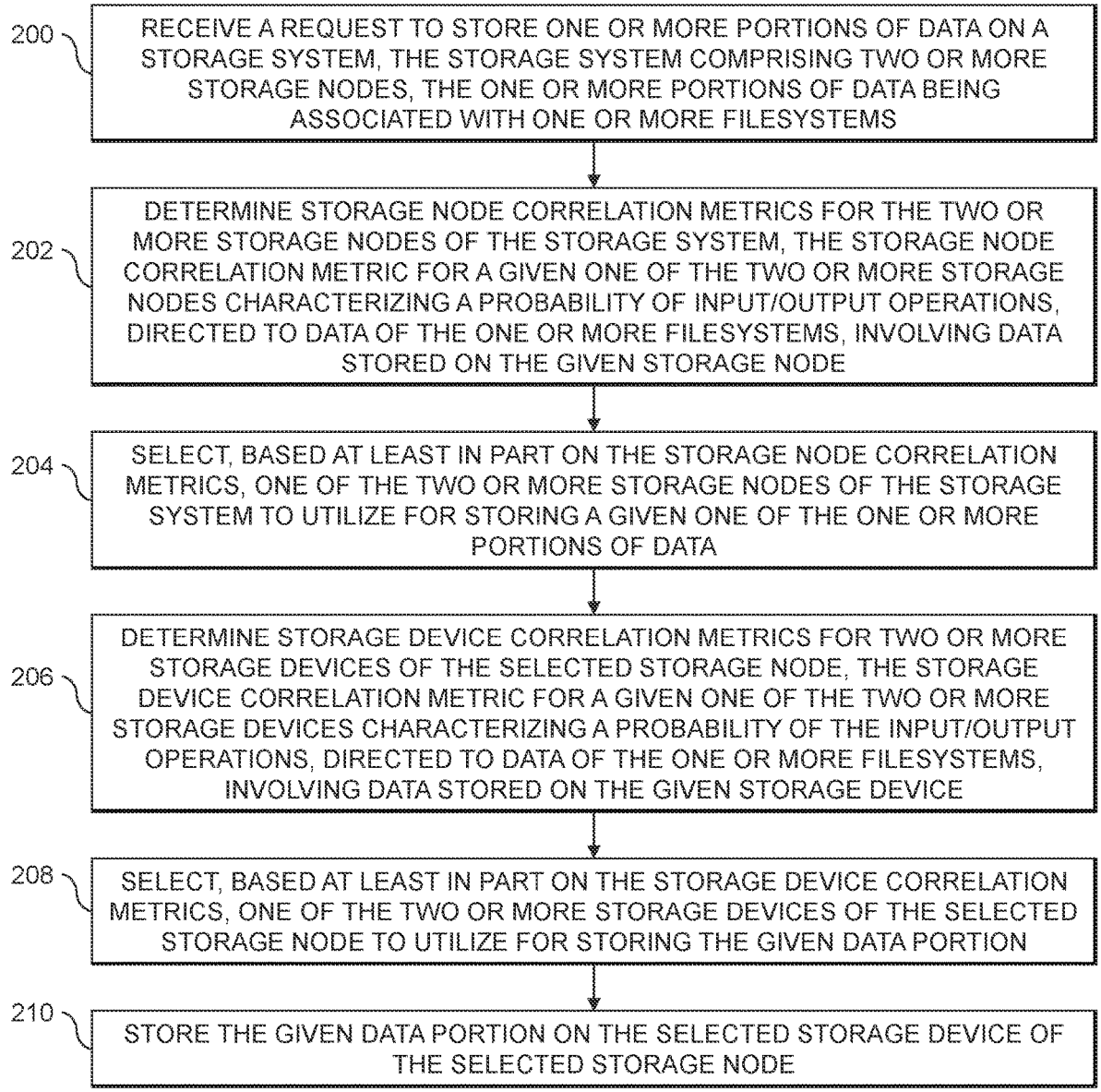
FIG. 2 is a flow diagram of an exemplary process for data placement selection among storage devices associated with storage nodes of a storage system in an illustrative embodiment.

An exemplary process for data placement selection among storage devices associated with storage nodes of a storage system will now be described in more detail with reference to the flow diagram of FIG. 2. It is to be understood that this particular process is only an example, and that additional or alternative processes for data placement selection among storage devices associated with storage nodes of a storage system may be used in other embodiments.

In this embodiment, the process includes steps 200 through 210. These steps are assumed to be performed by the storage node and storage device correlation metrics determination module 112 and the data placement selection module 114. The process begins with step 200, receiving a request to store one or more portions of data on a storage system, the storage system comprising two or more storage nodes, the one or more portions of data being associated with one or more filesystems. The storage system may comprise a distributed filesystem cluster. The distributed filesystem cluster may comprise a Hadoop distributed filesystem, and the two or more storage nodes may comprise data nodes of the Hadoop distributed filesystem.

In step 202, storage node correlation metrics are determined for the two or more storage nodes of the storage system. The storage node correlation metric for a given one of the two or more storage nodes characterizes a probability of IO operations directed to data of the one or more filesystems involving data stored on the given storage node. The storage node correlation metric for the given storage node may comprise a dynamic correlation metric that is based at least in part on an impact factor for the given storage node. The impact factor for the given storage node may be determined based at least in part on a storage capacity of the given storage node. The impact factor for the given storage node may be determined based at least in part on a comparison of the storage capacity of the given storage node with a minimum storage capacity of the two or more storage nodes. Step 202 may comprise, for the given storage node, determining pairwise storage node correlation metrics for the given storage node and each other storage node of the two or more storage nodes, the pairwise storage node correlation metrics characterizing numbers of data blocks of each of the one or more filesystems that are stored in common on the given storage node and each other storage node of the two or more storage nodes, and summing the pairwise storage node correlation metrics.

One of the two or more storage nodes of the storage system is selected in step 204 to utilize for storing a given one of the one or more portions of data based at least in part on the storage node correlation metrics.

In step 206, storage device correlation metrics are determined for two or more storage devices of the selected storage node. The storage device correlation metric for a given one of the two or more storage devices characterizes a probability of IO operations directed to data of the one or more filesystems involving data stored on the given storage device. The storage device correlation metric for the given storage device may comprise a dynamic correlation metric that is based at least in part on an impact factor for the given storage device. The impact factor for the given storage device may be determined based at least in part on a storage capacity of the given storage device. The impact factor for the given storage device may be determined based at least in part on a comparison of the storage capacity of the given storage device with a minimum storage capacity of the two or more storage devices of the selected storage node. Step 206 may comprise, for the given storage device, determining pairwise storage device correlation metrics for the given storage device and each other storage device of the two or more storage devices of the selected storage node, the pairwise storage device correlation metrics characterizing numbers of data blocks of each of the one or more filesystems that are stored in common on the given storage device and each other storage device of the two or more storage devices of the selected storage node, and summing the pairwise storage device correlation metrics.

One of the two or more storage devices of the selected storage node is selected in step 208 to utilize for storing the given data portion based at least in part on the storage device correlation metrics. The given data portion is stored on the selected storage device of the selected storage node in step 210.

The one or more portions of data to be stored may comprise two or more portions of data for a given one of the one or more filesystems, the given data portion comprising a first one of the two or more portions of data to be stored for the given filesystem. For a second one of the two or more portions of data to be stored for the given filesystem, the storage node correlation metrics may be updated to characterize probabilities of IO operations directed to data of the given filesystem involving data stored on the selected storage node and one or more other storage nodes of the two or more storage nodes storing data of the given filesystem. For the second one of the two or more portions of data to be stored for the given filesystem, the storage device correlation metrics may be updated to characterize probabilities of IO operations directed to data of the given filesystem involving data stored on the selected storage device and one or more other storage devices of the two or more storage devices of the selected storage node storing data of the given filesystem.

Illustrative embodiments provide techniques for optimal data placement selection policies in storage systems. In some embodiments, the storage system is assumed to comprise multiple storage arrays (also referred to as data nodes) that each have multiple storage devices (also referred to as disks) where new data may be stored. The optimal data placement policy takes into account dynamic file awareness correlation degrees among storage arrays or data nodes, so as to evenly distribute file data blocks to storage arrays or storage nodes with different capacity. Advantageously, this can guarantee that file read operations are more evenly distributed to all storage arrays or data nodes from an overall storage system view. The optimal data placement policy may further take into account dynamic file awareness correlation degrees among disks within a storage array or data node, so as to evenly distribute file data blocks to disks with different capacity within the storage array or data node. Advantageously, this can guarantee that file read operations are more evenly distributed to all disks from the storage array or data node view. The optimal data placement policy described herein can avoid "hot" point storage arrays or data nodes in the storage system, as well as "hot" point disks within a particular storage array or data node of the storage system, thereby improving storage system IO performance and stability.

Figure 3:
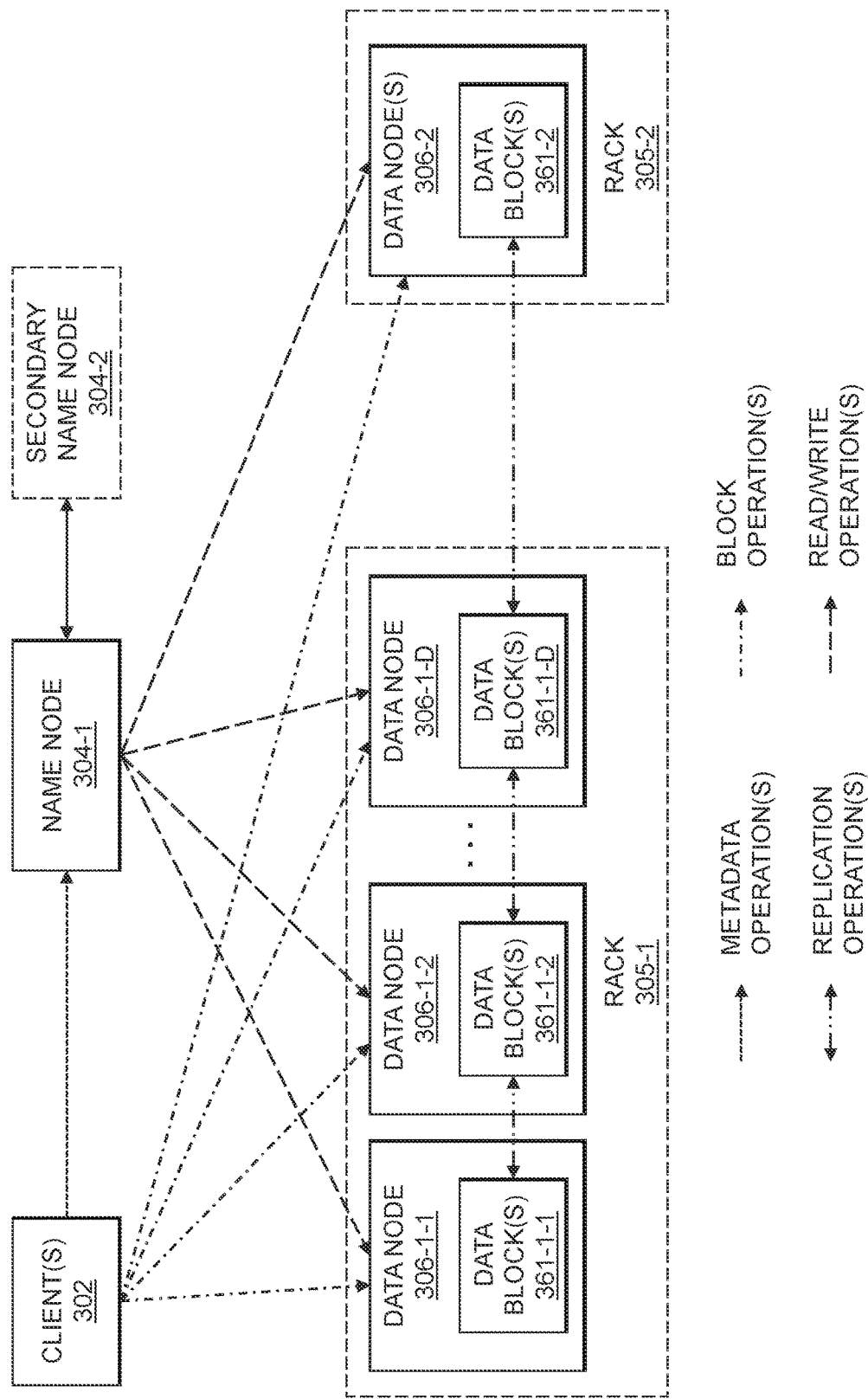
FIG. 3 shows a distributed filesystem architecture in an illustrative embodiment.

Various embodiments will be described below in the context of an optimal block volume selection policy for a Hadoop Distributed Filesystem (HDFS). FIG. 3 shows an example architecture for a HDFS, which includes one or more clients 302, a name node 304-1, an optional secondary name node 304-2, and multiple data nodes which are separated across multiple equipment racks 305-1 and 305-2 (collectively, racks 305). The rack 305-1 includes data nodes 306-1-1, 306-1-2, . . . 306-1-D (collectively, data nodes 306-1) and the rack 305-2 includes a set of data nodes 306-2. The data nodes 306-1 and 306-2, collectively referred to as data nodes 306, store data blocks. For example, data node 306-1-1 stores data blocks 361-1-1, data node 306-1-2 stores data blocks 361-1-2, data node 306-1-D stores data blocks 361-1-D, and data nodes 306-2 store data blocks 361-2. The data blocks 361-1-1, 361-1-2, . . . 361-1-D are collectively referred to as data blocks 361-1, and the data blocks 361-1 and 361-2 are collectively referred to as data blocks 361.

The HDFS utilizes a master/slave architecture, where the name node 304-1 acts as a "master" that manages a filesystem namespace and regulates access to files by the clients 302. The optional secondary name node 304-2 is configured to take checkpoints of filesystem metadata maintained by the name node 304-1. Such checkpoints may include edit logs indicating a sequence of changes made to the filesystem after the name node 304-1 has started. The secondary name node 304-2 can periodically apply such edit logs to a snapshot of the filesystem image to create a new filesystem image that is copied back to the name node 304-1. The name node 304-1 can use the new filesystem image at its next restart, thereby reducing the time required for restart as the number of filesystem edits to be merged is reduced (e.g., only those edits that occurred subsequent to the latest copying of the new filesystem image to the name node 304-1 will need to be merged).

The data nodes 306 each manage a set of disks on which data is stored. HDFS exposes a filesystem namespace allowing data to be stored in files. Internally, each file is split into one or more blocks with such blocks being stored by the data nodes 306 across the set of disks that it manages. The name node 304-1 manages filesystem namespace operations (e.g., opening, closing and renaming files and directories), and also determines the mappings of data blocks 361 to different ones of the data nodes 306. The data nodes 306 serve read and write requests from the clients 302. The data nodes perform block creation, deletion and replication (e.g., across different ones of the data nodes 306 within and across different racks 305) as instructed by the name node 304-1. FIG. 3 illustrates how metadata operations are performed between the clients 302 and the name node 304-1, block operations are performed between the name node 304-1 and the data nodes 306, replication operations are performed between the different data nodes 306 and racks 305, and read/write operations are performed between the clients 302 and the data nodes 306.

Figure 4:
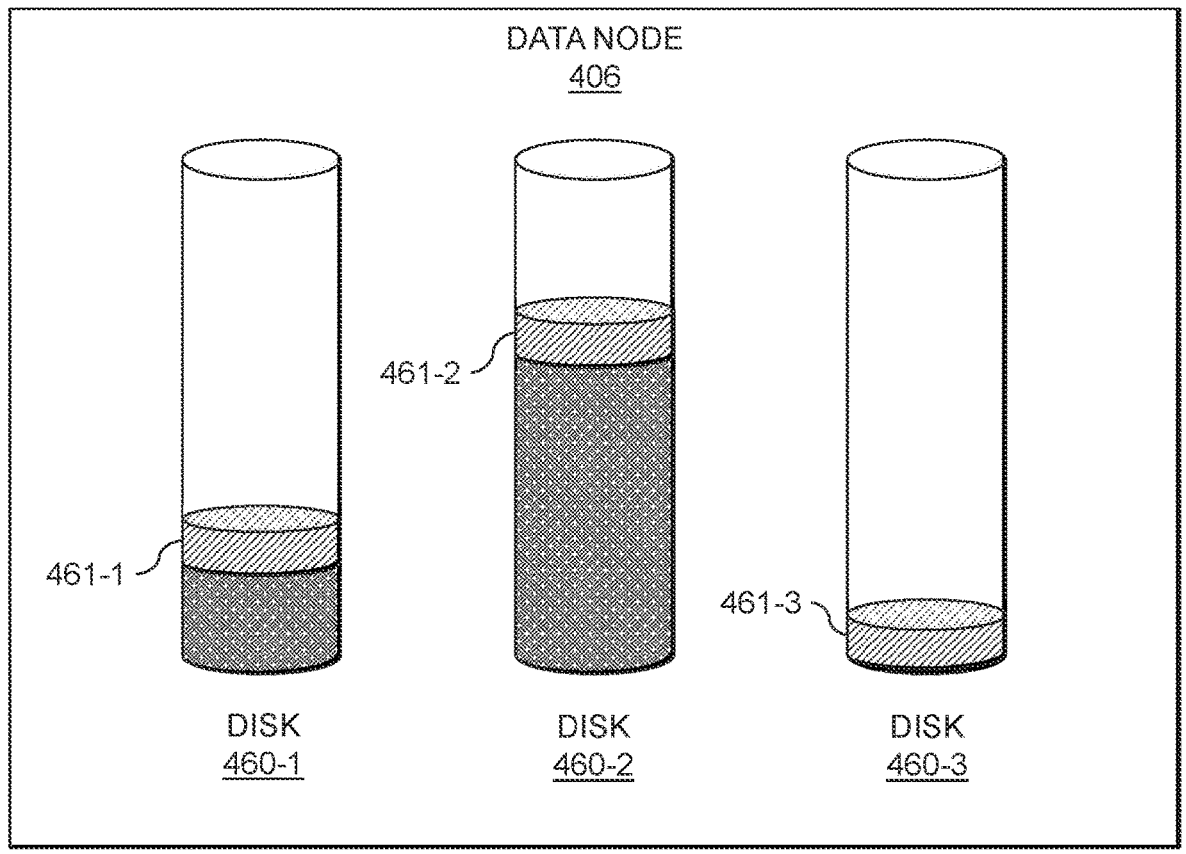
FIG. 4 shows a round-robin selection policy for storage volumes of a data node in an illustrative embodiment.
Figure 5:
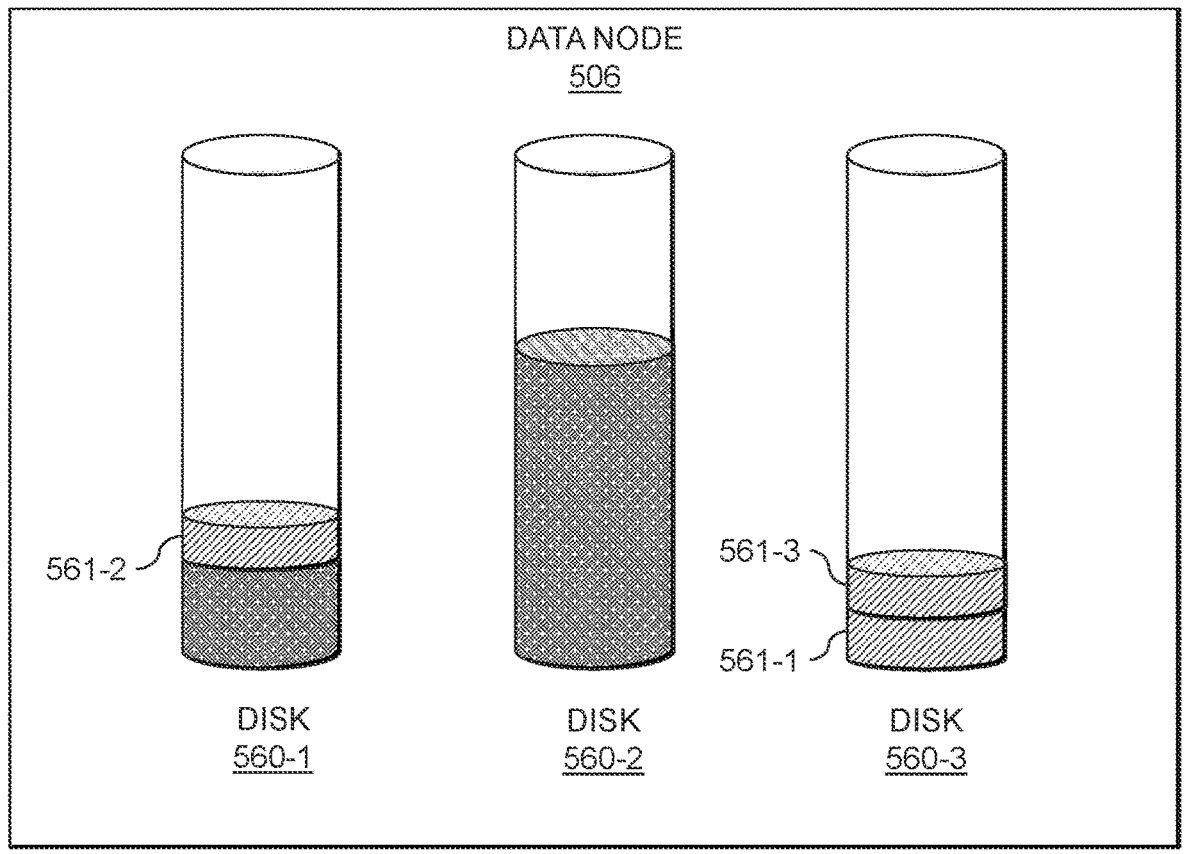
FIG. 5 shows an available space selection policy for storage volumes of a data node in an illustrative embodiment.
Figure 5:

Each data node 306 spreads its associated data blocks 361 into local filesystem directories, which can be specified using "dfs.datanode.dara.dir" in a configuration file (e.g., an "hdfs-site.xml" file). In a typical installation, each directory (referred to as a "volume" in HDFS terminology) is on a different device (e.g., a separate HDD or SSD). When writing new blocks to HDFS, the data nodes 306 use a selection policy to choose the disk to be used for each block. Currently supported selection policies include round-robin and available space. The round-robin selection policy distributes new blocks evenly across the available disks, while the available space policy preferentially writes data to the disk that has the freest space (e.g., by percentage). FIG. 4 shows a data node 406 with three disks 460-1, 460-2 and 460-3 (collectively, disks 460), where the data node 406 implements the round-robin selection policy to distribute new blocks 461-1, 461-2 and 461-3 evenly across the disks 460. FIG. 5 shows a data node 506 with three disks 560-1, 560-2 and 560-3 (collectively, disks 560), where the data node 506 implements the available space selection policy to preferentially write new data blocks 561-1, 561-2 and 561-3 to the one of the disks 560 having the freest space (e.g., by percentage).

The round-robin and available space policies can distribute HDFS data blocks to all data nodes, and to all disks within a data node. Such policies, however, do not ensure that data block distribution is even, especially from a file-level view and may thus lead to IO imbalance among HDFS data nodes and disks. Illustrative embodiment provide data placement policies that use file awareness dynamic correlation among data nodes and disks to determine and ensure a more even or balanced distribution of HDFS file blocks among HDFS data nodes and disks (more generally, among storage arrays of a storage system, and among storage devices of each of the storage arrays in the storage system).

Figure 6:
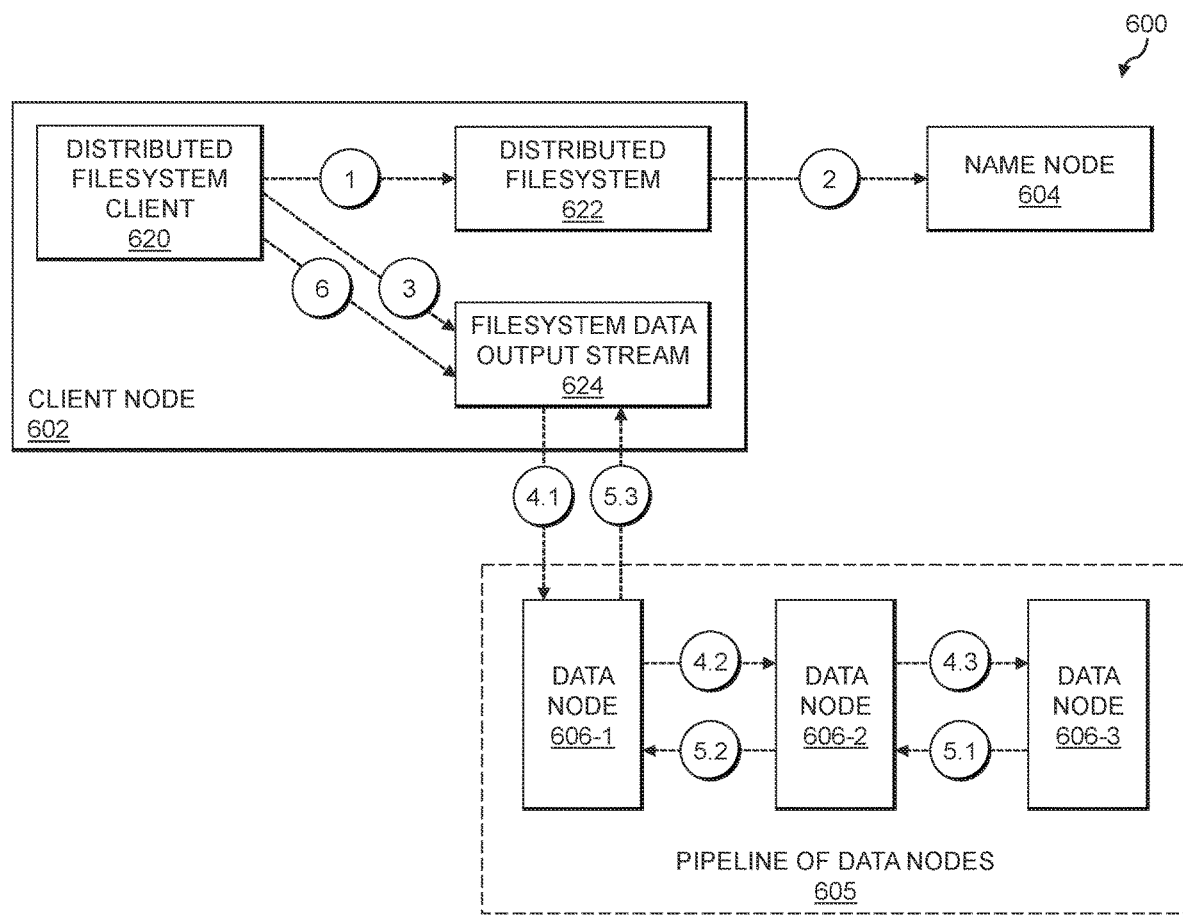
FIG. 6 shows a process flow for writing data in a distributed filesystem in an illustrative embodiment.

FIG. 6 shows a system 600 illustrating distributed filesystem (e.g., HDFS) file data block distribution and writes. The system 600 includes a client node 602, a name node 604, and a pipeline of data nodes 605 including data nodes 606-1, 606-2 and 606-3. The client node 602 includes a distributed filesystem client 620 (e.g., an HDFS client), a distributed filesystem component 622, and a filesystem data output stream component 624. The distributed filesystem client 620, the distributed filesystem component 622 and the filesystem data output stream component 624 may be implemented within a client Java virtual machine (JVM) that runs on the client node 602.

Consider that the distributed filesystem client 620 seeks to write a file to the distributed filesystem component 622, where the file is to be split into multiple blocks (e.g., based on a system block size of the distributed filesystem). The distributed filesystem client 620 sends a create request in step 1 to the distributed filesystem component 622, which interacts with the name node 604 to forward the create request in step 2. The name node 604 will respond with addresses of the particular data nodes 606-1, 606-2 and 606-3 in the pipeline of data nodes 605 where each block of the file is to be stored. Here, it is assumed that a replication factor of 3 is used, which is why there are three data nodes 606-1, 606-2 and 606-3 in the pipeline of data nodes 605. It should be noted that the three data nodes selected may be different for each block of the file that is to be stored. The overall distributed filesystem may include multiple other data nodes (not shown in FIG. 6) which are not selected. The distributed filesystem client 620 then writes the data in step 3, where the data is split into packets by the filesystem data output stream component 624 and then streamed for writing on the data nodes 606-1, 606-2 and 606-3 in the pipeline of data nodes 605 in steps 4.1, 4.2 and 4.3. The packet may be written in data node 606-1 first in step 4.1, and then forwarded from the data node 606-1 to the data node 606-2 for writing in step 4.2, and then forwarded from the data node 606-2 to the data node 606-3 for writing in step 4.3. Write acknowledgements are then sent by the data nodes 606-3, 606-2 and 606-1 in steps 5.1, 5.2 and 5.3, respectively. Once all the acknowledgements are received, the distributed filesystem client 620 then calls a close operation in step 6 to complete the write.

Figure 7:
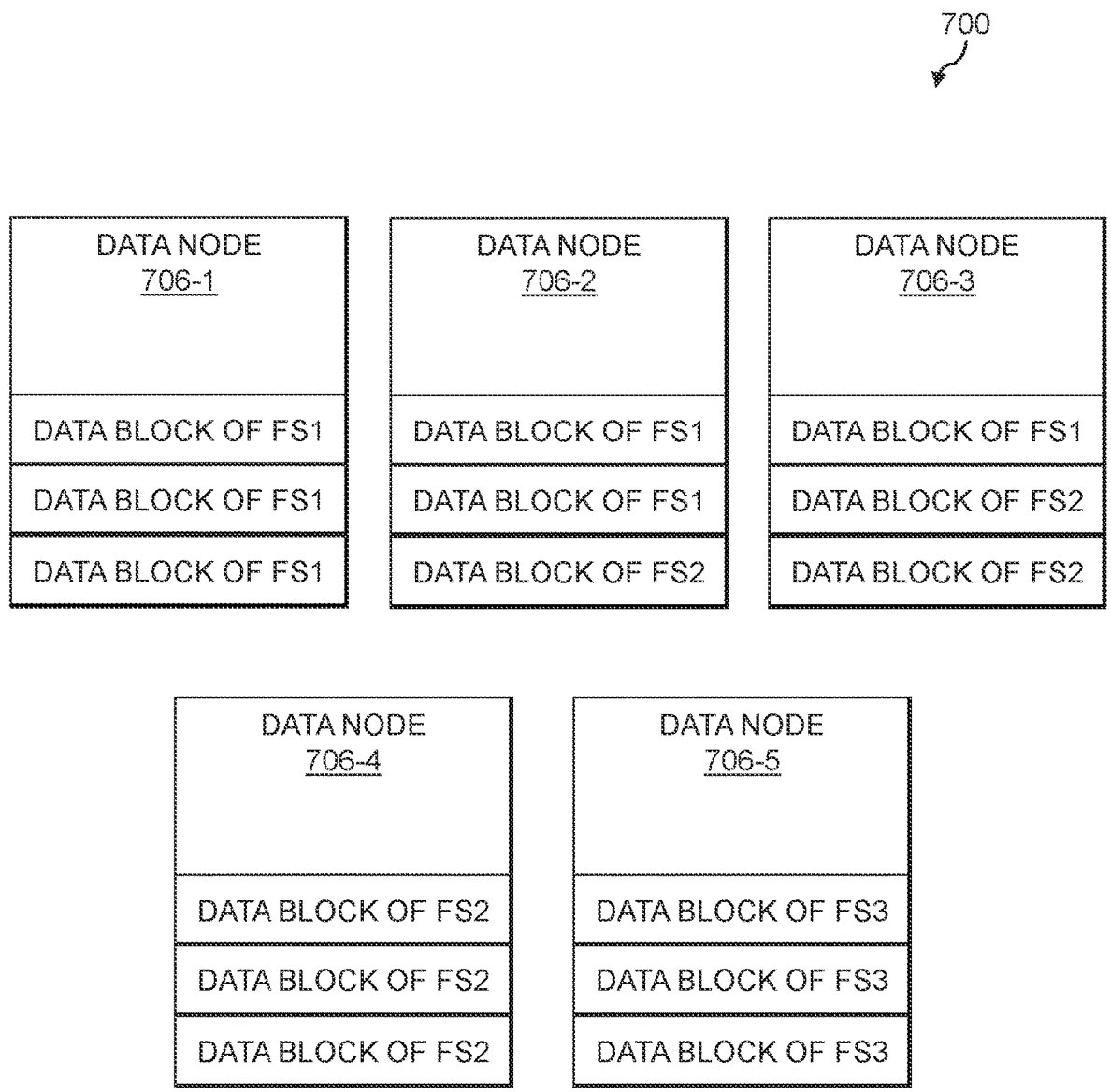
FIG. 7 shows an example of data blocks of different filesystems stored on different data nodes of a storage system in an illustrative embodiment.

The round-robin and available-space data placement selection policies described above with respect to FIGS. 4 and 5 do not consider file level data distribution, and treat all file data blocks the same way. Thus, it is possible for the total data blocks to be evenly distributed (e.g., in a distributed filesystem such as HDFS), but from the file view data blocks are not evenly distributed. Add/remove balancer and file deletion functionality, both at the data node and the disk level, can make such uneven distribution worse. This is illustrated in the system 700 of FIG. 7, which includes data nodes 706-1, 706-2, 706-3, 706-4 and 706-5 (collectively, data nodes 706). As shown, each of the data nodes 706 in the system 700 stores the same number of data blocks (e.g., 3). In the FIG. 7 example, the data node 706-1 stores three data blocks for filesystem 1 the data node 706-2 stores two data blocks for filesystem 1 and one data block for filesystem 2, the data node 706-3 stores one data block for filesystem 1 and two data blocks for filesystem 2, the data node 706-4 stores three data blocks for filesystem 2, and the data node 706-5 stores three data blocks for filesystem 3. Each of the data blocks for filesystem 1 are denoted datablock-FS1, each of the data blocks for filesystem 2 are denoted datablock-FS2, and each of the data blocks for filesystem 3 are denoted datablock-FS3.

Clients read and write in terms of files. When many HDFS clients read files from a HDFS storage system, if the file data blocks are not evenly distributed among the data nodes, then the read data block numbers will not be evenly split leading to hot points (e.g., where some data nodes are overloaded and other data nodes are not fully used). The situation within a data node is similar, where file data blocks may not be evenly distributed among the disks of a data node leading to hot points (e.g., where some of the disks in the data node are overloaded and other disks are not fully used). Such issues may be exacerbated for storage systems including data nodes and disks with different capacities, where it is more difficult to evenly distribute file data blocks to data nodes and disks to leverage all the available capacity at the same time which leads to poor HDFS storage system performance.

Figure 8:
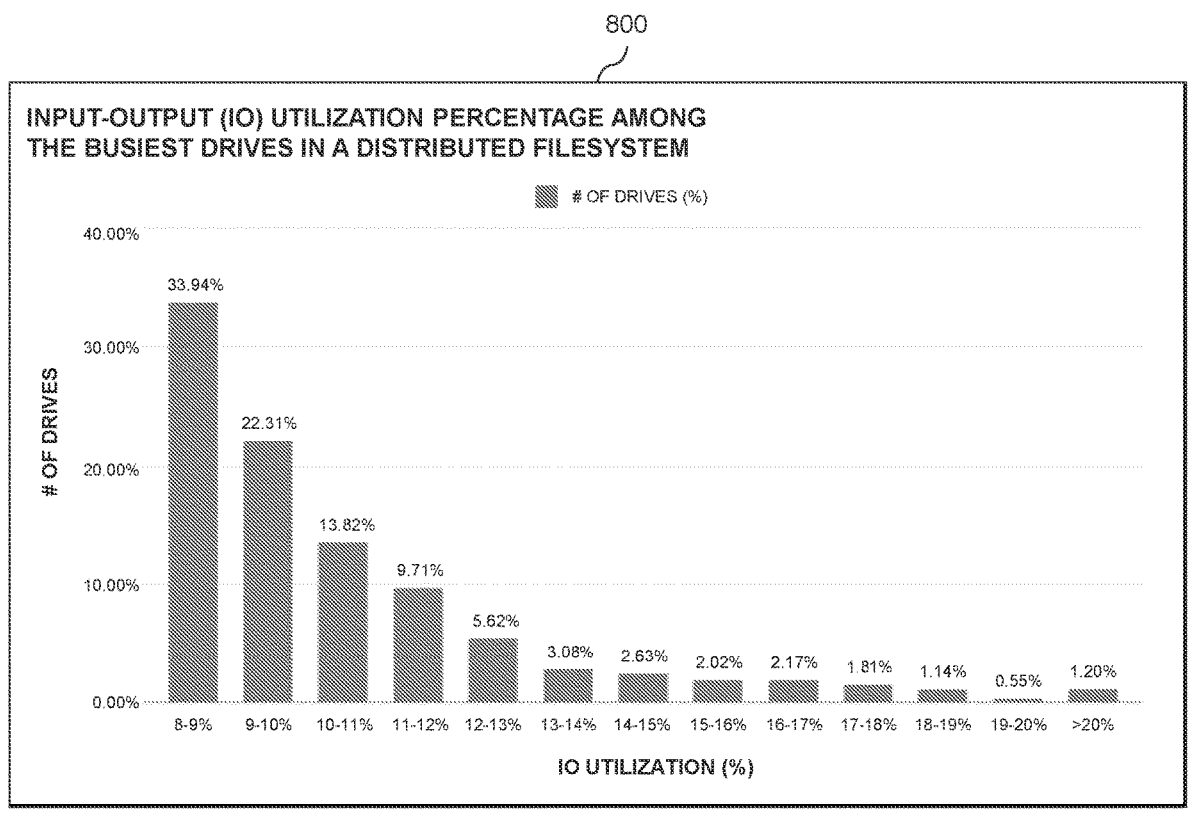
FIG. 8 shows a plot of input-output utilization percentage among drives in a distributed filesystem in an illustrative embodiment.
Figure 9:
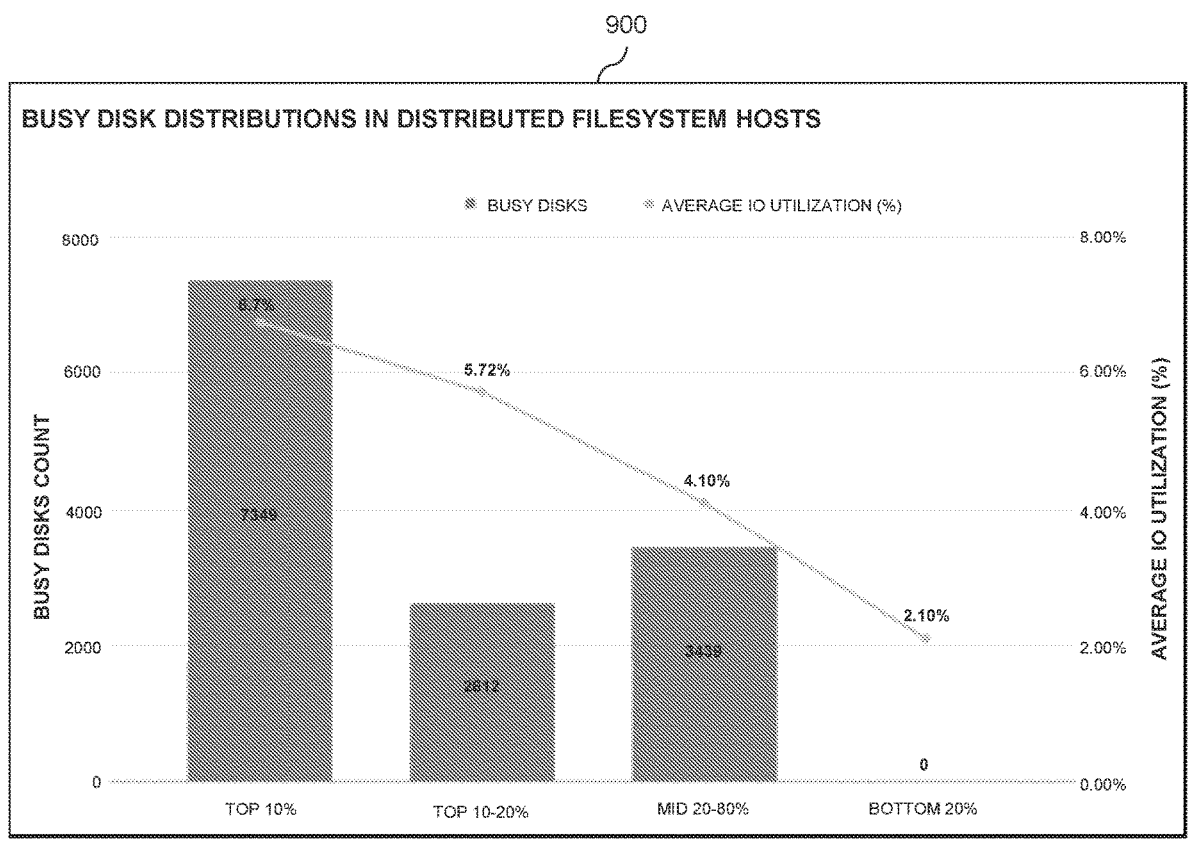
FIG. 9 shows a plot of distributions of busy disks in distributed filesystem hosts in an illustrative embodiment.

FIGS. 8 and 9 show respective plots 800 and 900 showing IO imbalance among data nodes and disks in a distributed filesystem (e.g., HDFS). The plot 800 of FIG. 8 shows IO utilization percentage among the busiest disks or drives in a distributed filesystem. The plot 900 of FIG. 9 shows busy disk distributions in distributed filesystem hosts. Here, "busy" disks or drives refer to those disks or drives with relatively higher IO utilization than other disks or drives. Similarly, "busiest" disks or drivers refer to those disks or drives with the highest disk IO utilization among a set of disks or drives. As shown in FIGS. 8 and 9, the tail end of disk IO utilization may be more than 15%, which is more than five times greater than the average disk IO utilization.

Even though these disks are a fraction of the entire disk pool, this may represent thousands of drives, which can imbalance disk IOs and drop the overall distributed filesystem performance. Thus, as illustrated in FIGS. 8 and 9, the busiest disks may be concentrated in a small group of hosts, rather than being distributed among all hosts. The busiest disks can thus have a much higher chance of becoming an IO bottleneck.

As noted above, illustrative embodiments take into account file awareness data node correlation degree when selecting a data block's location among multiple data nodes, as well as file awareness disk correlation degree when selecting a data block's location among multiple disks of a particular data node.

The file awareness data node correlation degree is defined as follows. If there exist x blocks residing in data node A, and y blocks residing in data node B from the same filesystem, then the file awareness data node correlation degree of data nodes A and B is (x+y). The file awareness data node correlation degree reflects the relativity between two data nodes—the bigger the file awareness data node correlation degree, the more probability that blocks in one data node need to read/write during filesystem events.

The file awareness disk correlation degree is defined as follows. If there exist v data blocks residing in disk C and w data blocks residing in disk D from the same filesystem, then the file awareness disk correlation degree of disks C and D is (v+w). The file awareness disk correlation degree reflects the relativity between two disks—the bigger the file awareness disk correlation degree, the more probability that data blocks in one disk need to read/write during filesystem events.

Figure 10:
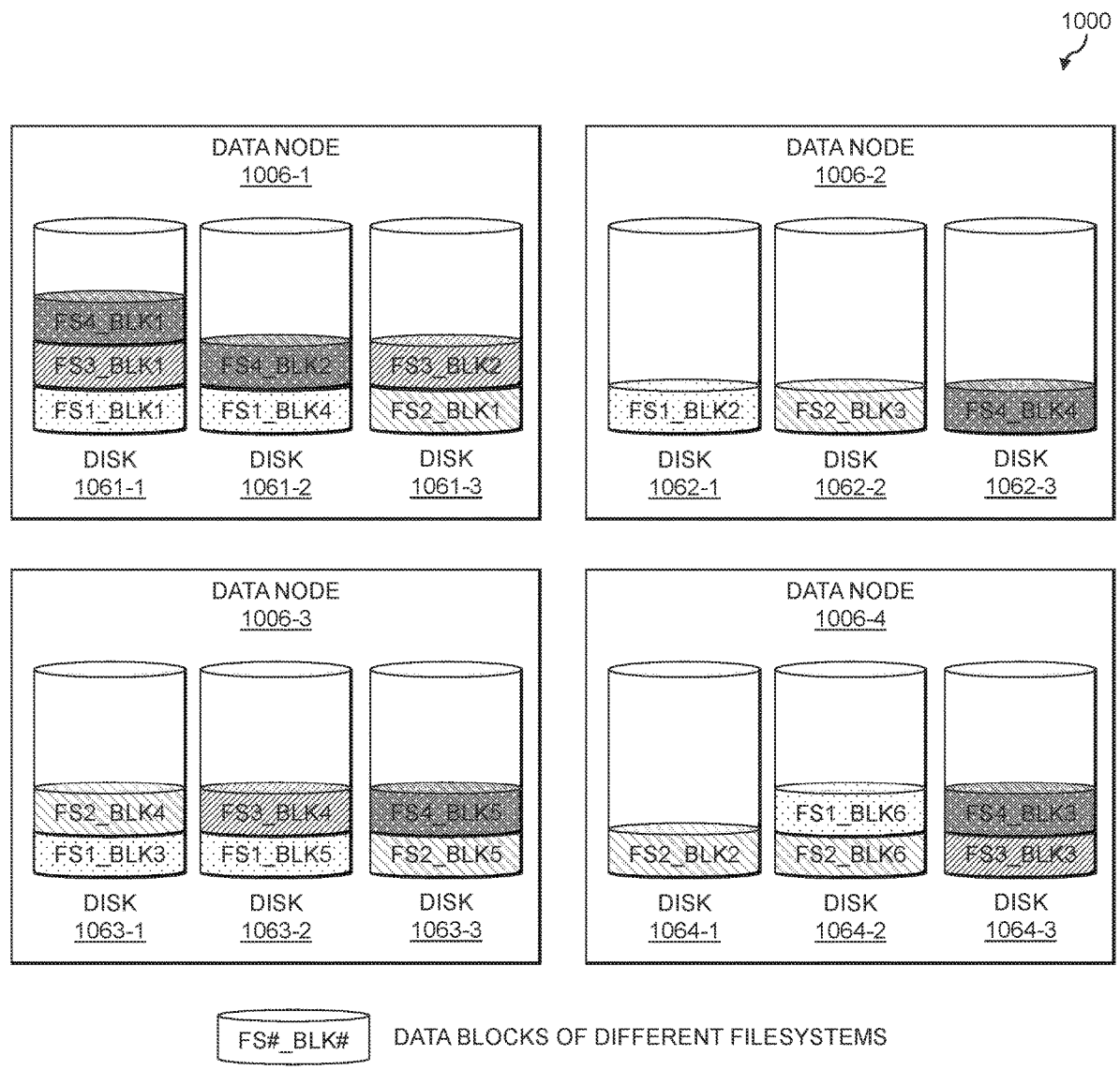
FIG. 10 shows another example of data blocks of different filesystems stored on different data nodes of a storage system in an illustrative embodiment.

FIG. 10 shows an example system 1000 where data blocks of different filesystems are distributed across a set of data nodes 1006-1, 1006-2, 1006-3 and 1006-4 (collectively, data nodes 1006), with each of the data nodes 1006 including a set of disks—disks 1061-1, 1061-2 and 1061-3 (collectively, disks 1061) for data node 1006-1; disks 1062-1, 1062-2 and 1062-3 (collectively, disks 1062) for data node 1006-2; disks 1063-1, 1063-2 and 1063-3 (collectively, disks 1063) for data node 1006-3; and disks 1064-1, 1064-2 and 1064-3 (collectively, disks 1064) for data node 1006-4. Different data blocks of different filesystems are stored across the disks 1061, 1062, 1063 and 1064 of the data nodes 1006 as illustrated in FIG. 10. In FIG. 10, the notation FS #_BLK # is used. For example, FS1_BLK1 denotes a first data block of filesystem 1, FS1_BLK2 denotes a second data block of filesystem 1, FS2_BLK1 denotes a first data block of filesystem 2, etc.

The file awareness data node correlation degree of data nodes 1006-1 and 1006-2 in the FIG. 10 example is computed as: $(2+1)^{FS1}+(1+1)^{FS2}+(2+1)^{FS4}=8$. The file awareness data node correlation degree of data nodes 1006-1 and 1006-3 in the FIG. 10 example is computed as: $(2+2)^{FS1}+(1+2)^{FS2}+(2+1)^{FS3}+(2+1)^{FS4}=13$.

The file awareness disk correlation degree of disks 1061-1 and 1061-2 in data node 1006-1 in the FIG. 10 example is computed as: $(1+1)^{FS1}+(1+1)^{FS4}=4$. The file awareness disk correlation degree of disks 1061-1 and 1061-3 in data node 1006-1 in the FIG. 10 example is computed as: $(1+1)^{FS3}=2$.

The file awareness data node and disk correlation degrees are used in some embodiments to quantify the equalization degree of how data blocks are distributed across all data nodes and disks in a storage system. In some embodiments, the storage system comprises a distributed filesystem such as HDFS, which includes data nodes and/or disks within the data nodes of different sizes. The technical solutions described herein enable full or improved use of storage space on such storage systems through the use of impact factors determined using file awareness data node and disk correlation degrees. By tuning the impact factor, the bigger an object's size is, the more likely it should be used for future incoming data blocks. To be detailed, how many times object A's size is bigger than object B, there will be that many times probability for object A to be selected than object B for future incoming data blocks. For example, consider a data node that includes a 400 gigabyte (GB) disk and an 800 GB disk. Here, the 800 GB disk will be twice as likely to be used for writing future incoming data blocks than the 400 GB disk. The technical solutions described herein also provide for dynamic correlation degrees, where both file awareness correlation degrees and the impact factor are considered to introduce a new definition for file awareness dynamic correlation degrees (e.g., equal to the file awareness correlation degree times the impact factor).

In the description below, the following notation is used. The correlation degree is represented by $\gamma$, and $\gamma_{DN\,i,DN\,j}$ denotes the file awareness correlation degree of data node i and data node j. Initially, $\gamma_{DN\,i,DN\,j}=0$. $\gamma_{DN\,i,DN\,j}=x+y$ if there exist x blocks residing in data node i and y blocks residing in data node j from the same filesystem. $\gamma_{DN\,i,DN\,i}=x$ if there exist x blocks residing in data node i from the same filesystem.

The file awareness correlation degree of data node i against all the data nodes in a storage pool (e.g., an HDFS pool) is determined according to:

$$\gamma_{DNi} = \sum_{j=1}^{M}\gamma_{DNi,DNj}$$

This represents the sum correlation degree of data node i and each other data node j in the storage pool, where M is the data node count.

The file awareness correlation degree of data node i against a given filesystem fs is determined according to:

$$\gamma_{DNi,FSfs} = \sum_{DNj\in fs} \gamma_{DNi,DNj}$$

This represents the sum correlation degree of data node i and each data node j where fs related data blocks are located.

The file awareness correlation degree of disk i and disk j is denoted $\gamma_{Disk\,i,Disk\,j}$. $\gamma_{Disk\,i,Disk\,j}=0$ initially. $\gamma_{Disk\,i,Disk\,j}=x+y$ if there exist x blocks residing in disk i and y blocks residing in disk j from the same filesystem. $\gamma_{Disk\,i,Disk\,i}=x$ if there exist x blocks residing in disk i from the same filesystem.

The file awareness correlation degree of disk i against all the disks in the current data node is determined according to:

$$\gamma_{Diski} = \sum_{j=1}^{L}\gamma_{Diski,Diskj}$$

This represents the sum correlation degree of disk i and each other disk j in the current data node, and L represents the disk count in the current data node.

The file awareness correlation degree of disk i against a given filesystem fs in the current data node is determined according to:

$$\gamma_{Disk\,i,FS\,fs} = \sum_{DN\,j \in fs'} \gamma_{DNi,DNj}$$

This represents the sum correlation degree of disk i and each disk j where the fs related data blocks are located in the current data node.

The impact factor of the file awareness data node correlation degree is determined according to:

$$\lambda_{\gamma,DN} = 1/\frac{S_{DN}}{S_{minDN}}$$

The impact factor depends on the data node's size, denoted $S_{DN}$. The bigger the size of the data node, the more likely it will be used for future incoming data blocks. $S_{min\,DN}$ denotes the minimum size among all the data nodes in the storage pool. The file awareness dynamic correlation degree of the data node is determined according to $\lambda_{\gamma,DN} \cdot \gamma_{DN}$.

The impact factor of the file awareness disk correlation degree is determined according to:

$$\lambda_{\gamma,Disk} = 1/\frac{S_{Disk}}{S_{minDisk}}$$

The impact factor depends on the disk size, denoted $S_{Disk}$. The bigger the size that the disk is, the more likely it will be used by future incoming data blocks. $S_{min\,Disk}$ denotes the minimum size among all the disks in the current data node. The file awareness dynamic correlation degree of a disk is determined according to $\lambda_{\gamma,Disk} \cdot \gamma_{Disk}$.

Figure 11:
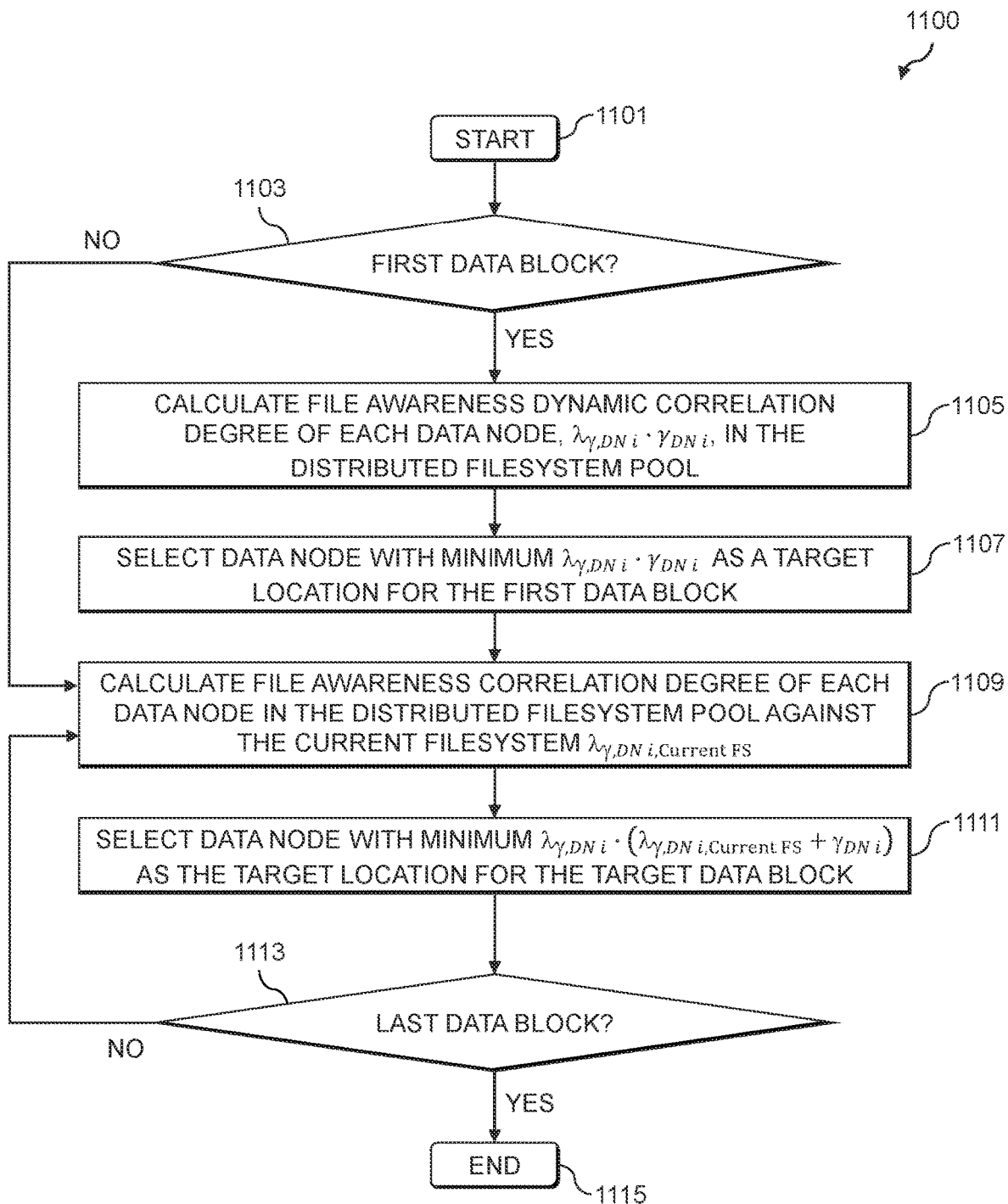
FIG. 11 shows a process flow for selecting data nodes on which to store data blocks based on data node correlation degrees in an illustrative embodiment.
Figure 12:
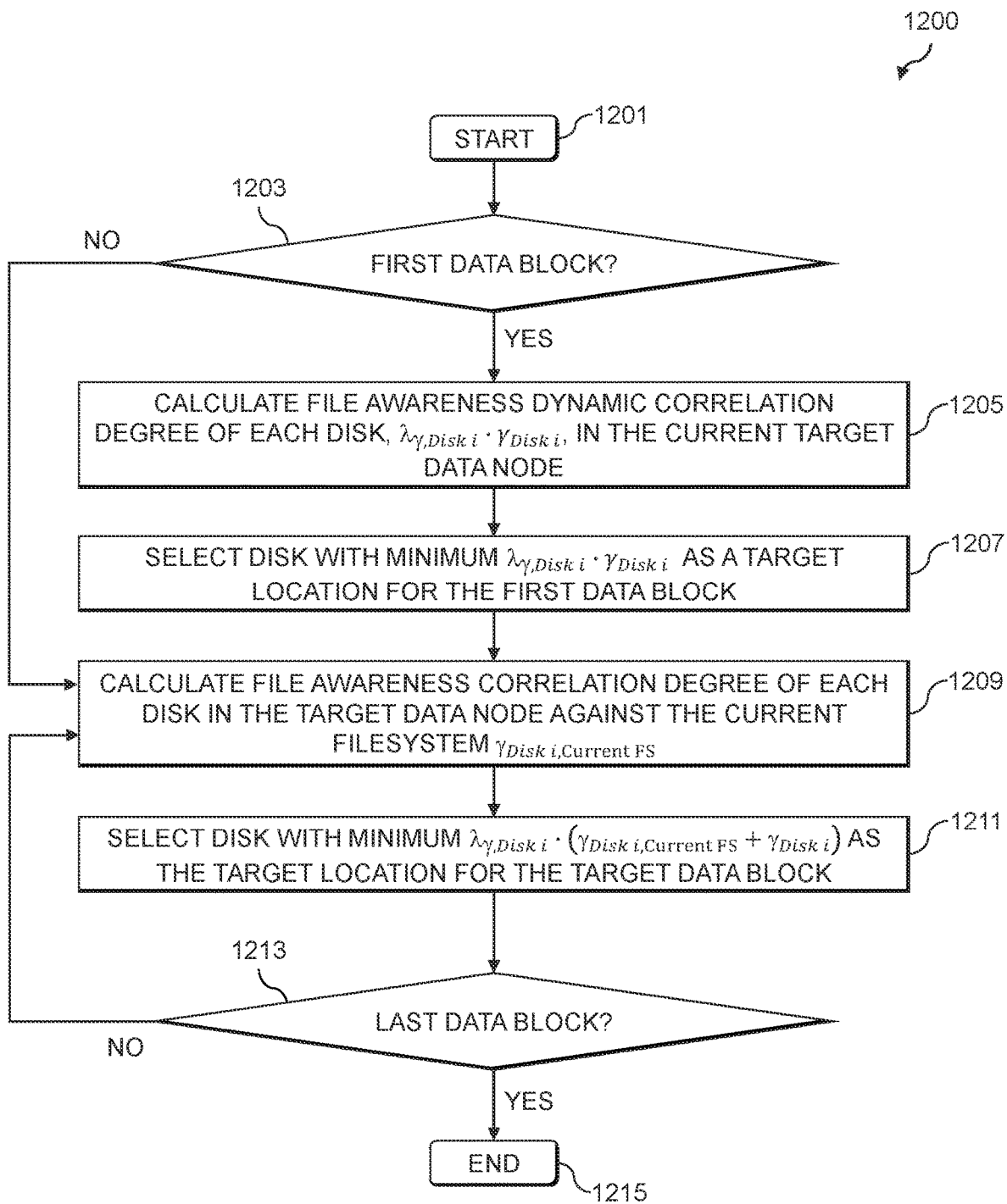
FIG. 12 shows a process flow for selecting storage devices of data nodes on which to storage data blocks based on storage device correlation degrees in an illustrative embodiment.

The file awareness dynamic correlation degrees (e.g., for data nodes and disks within data nodes) are used for a smart data block placement algorithm for a storage system, where the storage system may utilize a distributed filesystem architecture (e.g., HDFS). Suppose for a current filesystem, that there are N data blocks to be written. The algorithm below will be used to define the rules for how to select the target data node and target disk within the target data node for each of the N data blocks. FIG. 11 shows a process flow 1100 for selecting the target data nodes for data blocks, and FIG. 12 shows a process flow 1200 for selecting the target disks for data blocks within target data nodes.

The process flow 1100 starts in step 1101, and a determination is made in step 1103 as to whether the data block being considered, $D_l$, is a first data block. If the result of the step 1103 determination is yes, the process flow 1100 proceeds to step 1105 where the file awareness dynamic correlation degree $\lambda_{\gamma,DN\,i} \cdot \gamma_{DN\,i}$ of each data node i in the distributed filesystem storage pool is calculated. In step 1107, the data node with the minimum file awareness correlation degree $\lambda_{\gamma,DN\,i} \cdot \gamma_{DN\,i}$ is selected as the target data node. If there are multiple data nodes with the same minimum value, then the target data node for data block $D_l$ may be selected randomly from among those data nodes having the minimum file awareness correlation degree $\lambda_{\gamma,DN\,i} \cdot \gamma_{DN\,i}$.

Following step 1107, or if the step 1103 determination is no, the process flow 1100 proceeds to step 1109 for remaining data blocks $D_n$, where $1 < n \leq N$. In step 1109, the file awareness correlation degree $\lambda_{\gamma,DN\,i} \cdot (\gamma_{DN\,i,current\,FS} + \gamma_{DN\,i})$ of each data node i in the distributed filesystem pool is calculated against the current filesystem, denoted current FS. That is, for $D_n$ selection, the following is calculated:

$$\gamma_{DNi,currentFS} = \sum_{k=1}^{n-1} \gamma_{DNi,DN_{D_k}}$$

$DN_{D_k}$ denotes the data node where $D_k$ is located. Here, current FS has n−1 data blocks placed already. For example, to place $D_2$, the correlation degrees are calculated for each data node against the data node where $D_1$ is located. To place $D_3$, the correlation degrees are calculated for each data node against the data nodes where $D_1$ and $D_2$ are located. This continues, and to place $D_n$ the correlation degrees are calculated for each data node against the data nodes where $D_1, D_2, \ldots D_{n-1}$ are located. In step 1111, the data node with the minimum correlation degree $\gamma_{DN\,i,current\,FS} + \gamma_{DN\,i}$ is selected as the target data node to place the target data block $D_n$. If there are multiple data nodes with same minimum value, the target data node may be randomly selected from amongst those data nodes having the minimum value. In step 1113, a determination is made as to whether the last data block has been processed. If the result of the step 1113 determination is no, the process flow 1100 returns to step 1109. If the result of the step 1113 determination is yes, the process flow 1100 ends in step 1115.

The process flow 1200 starts in step 1201, and a determination is made in step 1203 as to whether the data block being considered, $D_l$, is a first data block. If the result of the step 1203 determination is yes, the process flow 1200 proceeds to step 1205 where the file awareness dynamic correlation degree $\lambda_{\gamma,Disk\,i} \cdot \gamma_{Disk\,i}$ of each disk i in the current data node is calculated. In step 1207, the disk with the minimum file awareness correlation degree $\lambda_{\gamma,Disk\,i} \cdot \gamma_{Disk\,i}$ is selected as the target disk. If there are multiple disks with the same minimum value, then the target disk for data block $D_l$ may be selected randomly from among those disks having the minimum file awareness correlation degree $\lambda_{\gamma,Disk\,i} \cdot \gamma_{Disk\,i}$.

Following step 1207, or if the step 1203 determination is no, the process flow 1200 proceeds to step 1209 for remaining data blocks $D_n$, where $1 < n \leq N$. In step 1209, the file awareness correlation degree $\lambda_{\gamma,Disk\,i} \cdot (\gamma_{Disk\,i,current\,FS} + \gamma_{Disk\,i})$ of each disk i in the current data node is calculated against the current filesystem, denoted current FS. That is, for $D_n$ selection, the following is calculated:

$$\gamma_{Diski,currentFS} = \sum_{k=1}^{n-1} \gamma_{Diski,Disk_{D_k}}$$

$Disk_{D_k}$ denotes the disk where $D_k$ is located. Here, current FS has n−1 data blocks placed already on disks of the current target data node. For example, to place $D_2$, the correlation degrees are calculated for each disk against the disk where $D_1$ is located. To place $D_3$, the correlation degrees are calculated for each disk against the disk where $D_1$ and $D_2$ are located. This continues, and to place $D_n$ the correlation degrees are calculated for each disk against the disks where $D_1, D_2, \ldots D_{n-1}$ are located. In step 1211, the disk with the minimum correlation degree $\gamma_{Disk\,i,current\,FS} + \gamma_{Disk\,i}$ is selected as the target disk to place the target data block $D_n$. If there are multiple disks with same minimum value, the target disk may be randomly selected from amongst those disks in the current target data node having the minimum value. In step 1213, a determination is made as to whether the last data block has been processed. If the result of the step 1213 determination is no, the process flow 1200 returns to step 1209. If the result of the step 1213 determination is yes, the process flow 1200 ends in step 1215.

The process flows 1100 and 1200 of FIGS. 11 and 12 may be used to evaluate the file awareness correlation degree, both at the data node and the disk level, when new data blocks are to be placed. Thus, the process flows 1100 and 1200 make it easier to balance the same filesystem's data blocks across a whole distributed filesystem storage pool. Thus, when the filesystem is accessed, there are more data nodes and disks involved in filesystem related events.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for data placement selection among storage devices associated with storage nodes of a storage system will now be described in greater detail with reference to FIGS. 13 and 14. Although described in the context of system 100, these platforms may also be used to implement at least portions of other information processing systems in other embodiments.

Figure 13:
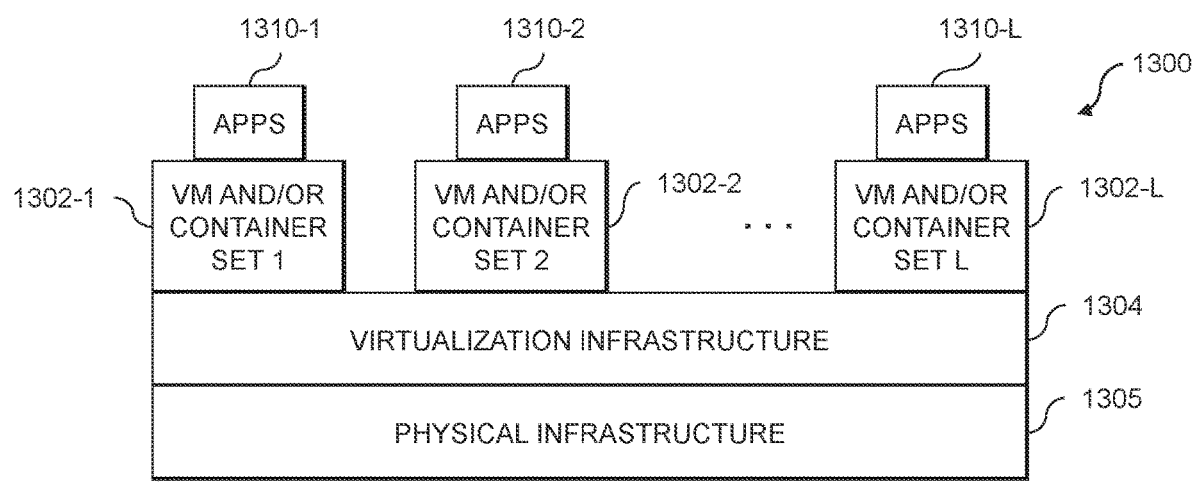
FIGS. 13 and 14 show examples of processing platforms that may be utilized to implement at least a portion of an information processing system in illustrative embodiments.
Figure 14:
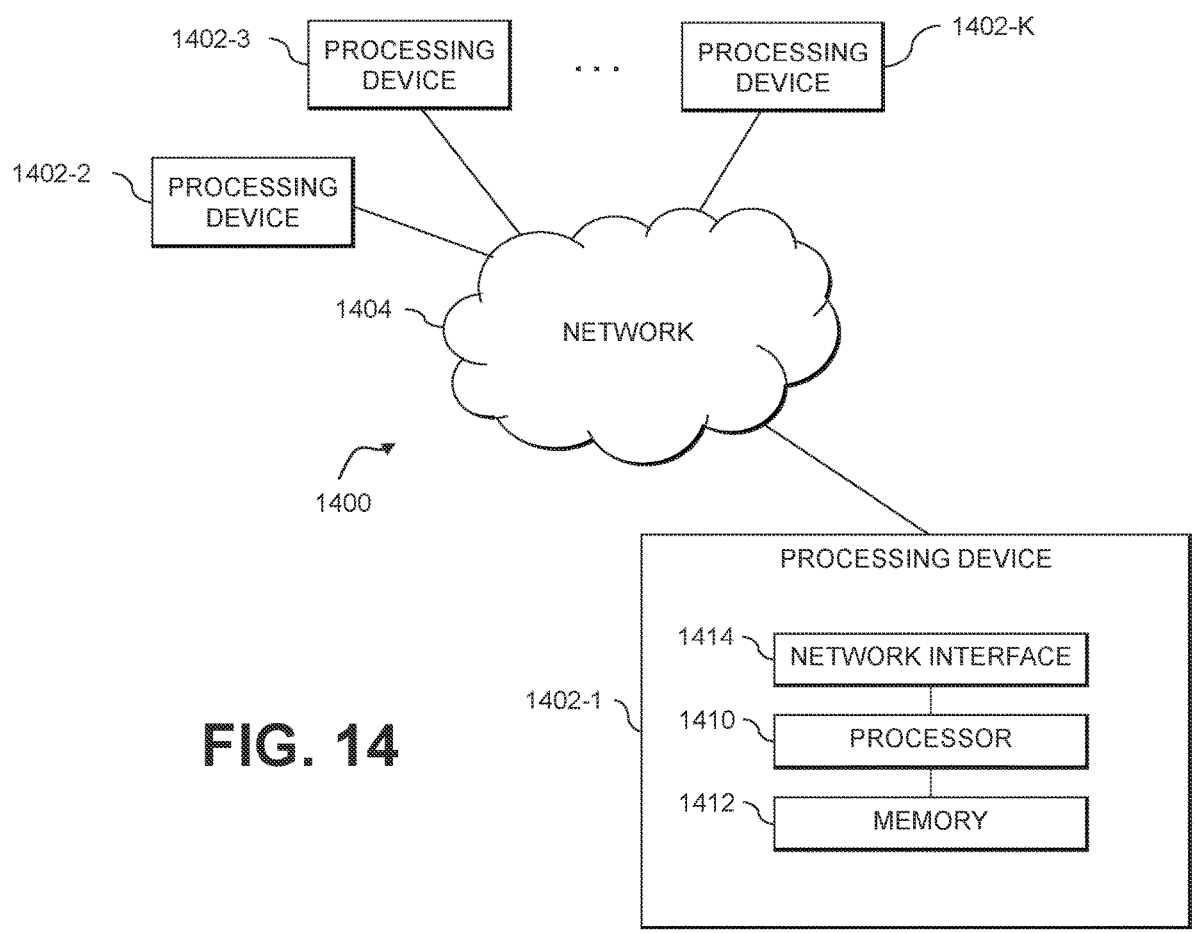

FIG. 13 shows an example processing platform comprising cloud infrastructure 1300. The cloud infrastructure 1300 comprises a combination of physical and virtual processing resources that may be utilized to implement at least a portion of the information processing system 100 in FIG. 1. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. A hypervisor platform may be used to implement a hypervisor within the virtualization infrastructure 1304, where the hypervisor platform has an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for data placement selection among storage devices associated with storage nodes of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
        receiving a request to store one or more portions of data on a storage system, the storage system comprising two or more storage nodes, the one or more portions of data being associated with one or more filesystems;
        determining storage node correlation metrics for the two or more storage nodes of the storage system, the storage node correlation metric for a given one of the two or more storage nodes characterizing a probability of input/output operations, directed to data of the one or more filesystems, involving data stored on the given storage node, the storage node correlation metric for the given storage node being based at least in part on a determination of whether any of the data of the one or more filesystems is stored in common on the given storage node and one or more other ones of the two or more storage nodes;
        selecting, based at least in part on the storage node correlation metrics, one of the two or more storage nodes of the storage system to utilize for storing a given one of the one or more portions of data;
        determining storage device correlation metrics for two or more storage devices of the selected storage node, the storage device correlation metric for a given one of the two or more storage devices characterizing a probability of the input/output operations, directed to data of the one or more filesystems, involving data stored on the given storage device, the storage device correlation metric for the given storage node being based at least in part on a determination of whether any of the data of the one or more filesystems is stored in common on the given storage device and one or more other ones of the two or more storage devices;
        selecting, based at least in part on the storage device correlation metrics, one of the two or more storage devices of the selected storage node to utilize for storing the given data portion; and
        storing the given data portion on the selected storage device of the selected storage node.

2. The apparatus of claim 1 wherein the storage system comprises a distributed filesystem cluster.

3. The apparatus of claim 2 wherein the distributed filesystem cluster comprises a Hadoop distributed filesystem, and wherein the two or more storage nodes comprise data nodes of the Hadoop distributed filesystem.

4. The apparatus of claim 1 wherein determining the storage node correlation metric for the given storage node comprises:
    determining pairwise storage node correlation metrics for the given storage node and each other storage node of the two or more storage nodes, the pairwise storage node correlation metrics characterizing numbers of data blocks of each of the one or more filesystems that are stored in common on the given storage node and each other storage node of the two or more storage nodes; and
    summing the pairwise storage node correlation metrics.

5. The apparatus of claim 1 wherein the storage node correlation metric for the given storage node comprises a dynamic correlation metric that is based at least in part on an impact factor for the given storage node.

6. The apparatus of claim 5 wherein the impact factor for the given storage node is determined based at least in part on a storage capacity of the given storage node.

7. The apparatus of claim 5 wherein the impact factor for the given storage node is determined based at least in part on a comparison of a storage capacity of the given storage node and a minimum storage capacity of the two or more storage nodes.

8. The apparatus of claim 1 wherein determining the storage device correlation metric for the given storage device comprises:
    determining pairwise storage device correlation metrics for the given storage device and each other storage device of the two or more storage devices of the selected storage node, the pairwise storage device correlation metrics characterizing numbers of data blocks of each of the one or more filesystems that are stored in common on the given storage device and each other storage device of the two or more storage devices of the selected storage node; and
    summing the pairwise storage device correlation metrics.

9. The apparatus of claim 1 wherein the storage device correlation metric for the given storage device comprises a dynamic correlation metric that is based at least in part on an impact factor for the given storage device.

10. The apparatus of claim 9 wherein the impact factor for the given storage device is determined based at least in part on a storage capacity of the given storage device.

11. The apparatus of claim 9 wherein the impact factor for the given storage device is determined based at least in part on a comparison of a storage capacity of the given storage device and a minimum storage capacity of the two or more storage devices of the selected storage node.

12. The apparatus of claim 1 wherein the one or more portions of data to be stored comprise two or more portions of data for a given one of the one or more filesystems, the given data portion comprising a first one of the two or more portions of data to be stored for the given filesystem.

13. The apparatus of claim 12 wherein for a second one of the two or more portions of data to be stored for the given filesystem, the storage node correlation metrics are updated to characterize probabilities of input/output operations directed to data of the given filesystem involving data stored on the selected storage node and one or more other storage nodes of the two or more storage nodes storing data of the given filesystem.

14. The apparatus of claim 12 wherein for a second one of the two or more portions of data to be stored for the given filesystem, the storage device correlation metrics are updated to characterize probabilities of input/output operations directed to data of the given filesystem involving data stored on the selected storage device and one or more other storage devices of the two or more storage devices of the selected storage node storing data of the given filesystem.

15. A computer program product comprising a non-transitory processor-readable storage medium having stored therein program code of one or more software programs, wherein the program code when executed by at least one processing device causes the at least one processing device to perform steps of:
receiving a request to store one or more portions of data on a storage system, the storage system comprising two or more storage nodes, the one or more portions of data being associated with one or more filesystems;
determining storage node correlation metrics for the two or more storage nodes of the storage system, the storage node correlation metric for a given one of the two or more storage nodes characterizing a probability of input/output operations, directed to data of the one or more filesystems, involving data stored on the given storage node, the storage node correlation metric for the given storage node being based at least in part on a determination of whether any of the data of the one or more filesystems is stored in common on the given storage node and one or more other ones of the two or more storage nodes;
selecting, based at least in part on the storage node correlation metrics, one of the two or more storage nodes of the storage system to utilize for storing a given one of the one or more portions of data;
determining storage device correlation metrics for two or more storage devices of the selected storage node, the storage device correlation metric for a given one of the two or more storage devices characterizing a probability of the input/output operations, directed to data of the one or more filesystems, involving data stored on the given storage device, the storage device correlation metric for the given storage node being based at least in part on a determination of whether any of the data of the one or more filesystems is stored in common on the given storage device and one or more other ones of the two or more storage devices;
selecting, based at least in part on the storage device correlation metrics, one of the two or more storage devices of the selected storage node to utilize for storing the given data portion; and
storing the given data portion on the selected storage device of the selected storage node.

16. The computer program product of claim 15 wherein the storage node correlation metric for the given storage node comprises a dynamic correlation metric that is based at least in part on an impact factor for the given storage node, and wherein the impact factor for the given storage node is determined based at least in part on a storage capacity of the given storage node.

17. The computer program product of claim 15 wherein the storage device correlation metric for the given storage device comprises a dynamic correlation metric that is based at least in part on an impact factor for the given storage device, and wherein the impact factor for the given storage device is determined based at least in part on a storage capacity of the given storage device.

18. A method comprising:
receiving a request to store one or more portions of data on a storage system, the storage system comprising two or more storage nodes, the one or more portions of data being associated with one or more filesystems;
determining storage node correlation metrics for the two or more storage nodes of the storage system, the storage node correlation metric for a given one of the two or more storage nodes characterizing a probability of input/output operations, directed to data of the one or more filesystems, involving data stored on the given storage node, the storage node correlation metric for the given storage node being based at least in part on a determination of whether any of the data of the one or more filesystems is stored in common on the given storage node and one or more other ones of the two or more storage nodes;
selecting, based at least in part on the storage node correlation metrics, one of the two or more storage nodes of the storage system to utilize for storing a given one of the one or more portions of data;
determining storage device correlation metrics for two or more storage devices of the selected storage node, the storage device correlation metric for a given one of the two or more storage devices characterizing a probability of the input/output operations, directed to data of the one or more filesystems, involving data stored on the given storage device, the storage device correlation metric for the given storage node being based at least in part on a determination of whether any of the data of the one or more filesystems is stored in common on the given storage device and one or more other ones of the two or more storage devices;
selecting, based at least in part on the storage device correlation metrics, one of the two or more storage devices of the selected storage node to utilize for storing the given data portion; and
storing the given data portion on the selected storage device of the selected storage node;
wherein the method is performed by at least one processing device comprising a processor coupled to a memory.

19. The method of claim 18 wherein the storage node correlation metric for the given storage node comprises a dynamic correlation metric that is based at least in part on an impact factor for the given storage node, and wherein the impact factor for the given storage node is determined based at least in part on a storage capacity of the given storage node.

20. The method of claim 18 wherein the storage device correlation metric for the given storage device comprises a dynamic correlation metric that is based at least in part on an impact factor for the given storage device, and wherein the impact factor for the given storage device is determined based at least in part on a storage capacity of the given storage device.

* * * * *